(12) United States Patent
Beer et al.

(10) Patent No.: US 11,796,673 B2
(45) Date of Patent: Oct. 24, 2023

(54) OBJECT SENSE AND AVOID SYSTEM FOR AUTONOMOUS VEHICLES

(71) Applicant: Reginald N. Beer, Livermore, CA (US)

(72) Inventors: N. Reginald Beer, Pleasanton, CA (US); David Chambers, Livermore, CA (US); David W. Paglieroni, Pleasanton, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 521 days.

(21) Appl. No.: 16/315,142

(22) PCT Filed: Jul. 6, 2016

(86) PCT No.: PCT/US2016/041208
§ 371 (c)(1),
(2) Date: Jan. 3, 2019

(87) PCT Pub. No.: WO2018/009189
PCT Pub. Date: Jan. 11, 2018

(65) Prior Publication Data
US 2019/0250641 A1    Aug. 15, 2019

(51) Int. Cl.
*G01S 13/933* (2020.01)
*G05D 1/10* (2006.01)
(Continued)

(52) U.S. Cl.
CPC .......... *G01S 13/933* (2020.01); *B64C 39/024* (2013.01); *G05D 1/106* (2019.05);
(Continued)

(58) Field of Classification Search
None
See application file for complete search history.

(56) References Cited

U.S. PATENT DOCUMENTS

| 5,006,988 A | 4/1991 | Borenstein et al. |
| 6,134,502 A | 10/2000 | Sarangapani |

(Continued)

FOREIGN PATENT DOCUMENTS

| CN | 104407616 A | 3/2015 |
| CN | 105318888 A | 2/2016 |

(Continued)

OTHER PUBLICATIONS

Song Gwang Yul "System and method for path planning for autonomous navigation of driverless ground vehicle" (Year: 2015).*

(Continued)

*Primary Examiner* — James M McPherson
*Assistant Examiner* — Bakari Underwood
(74) *Attorney, Agent, or Firm* — Perkins Coie LLP

(57) ABSTRACT

A system for determining a travel path for an autonomous vehicle ("AV") to travel to a target while avoiding objects (i.e., obstacles) without the use of an imaging system is provided. An object sense and avoid ("OSA") system detects objects in an object field that is adjacent to the AV and dynamically generates, as the AV travels, a travel path to the target to avoid the objects. The OSA system repeatedly uses sensors to collect sensor data of any objects in the object field. An object detection system then detects the objects and determines their locations based on triangulating ranges to an object as indicated by different sensors. The path planner system then plans a next travel direction for the AV to avoid the detected objects while seeking to minimize the distance traveled. The OSA system then instructs the AV to travel in the travel direction.

37 Claims, 11 Drawing Sheets

(51) Int. Cl.
*B64C 39/02* (2023.01)
*G08G 5/00* (2006.01)
*G08G 5/04* (2006.01)
*G01S 13/48* (2006.01)
*G01S 13/93* (2020.01)

(52) U.S. Cl.
CPC ......... *G08G 5/0069* (2013.01); *G08G 5/0078* (2013.01); *G08G 5/045* (2013.01); *B64U 2201/10* (2023.01); *G01S 13/48* (2013.01); *G01S 13/93* (2013.01)

(56) References Cited

U.S. PATENT DOCUMENTS

| | | |
|---|---|---|
| 6,712,312 B1 | 3/2004 | Kucik |
| 8,234,067 B2 | 7/2012 | Bauer et al. |
| 8,717,223 B2 | 5/2014 | Chambers et al. |
| 8,761,603 B1 | 6/2014 | Maleki |
| 8,766,845 B2 | 7/2014 | Hallquist et al. |
| 9,043,021 B1 | 5/2015 | Clark et al. |
| 9,102,406 B2 | 8/2015 | Stark et al. |
| 9,104,201 B1 | 8/2015 | Pillai et al. |
| 9,137,847 B1 | 9/2015 | Ayyagari et al. |
| 9,407,881 B2 | 8/2016 | Renkis |
| 9,429,945 B2 | 8/2016 | Pulleti et al. |
| 9,599,994 B1 | 3/2017 | Bogdanowicz et al. |
| 9,780,859 B2 | 10/2017 | Chang et al. |
| 9,798,329 B2 | 10/2017 | Shattil |
| 9,841,761 B2 | 12/2017 | Shehata et al. |
| 9,989,965 B2 | 6/2018 | Cuban et al. |
| 10,107,891 B1 | 10/2018 | Ngo et al. |
| 10,956,980 B1* | 3/2021 | Flick .................. G06Q 40/08 |
| 2004/0017312 A1 | 1/2004 | Anderson et al. |
| 2006/0184292 A1 | 8/2006 | Appleby et al. |
| 2006/0293792 A1 | 12/2006 | Hasegawa et al. |
| 2007/0021880 A1 | 1/2007 | Appleby et al. |
| 2007/0156286 A1* | 7/2007 | Yamauchi ............ G05D 1/0278 700/245 |
| 2007/0299947 A1 | 12/2007 | El-Damhougy |
| 2010/0042269 A1* | 2/2010 | Kokkeby .............. G01S 3/7864 701/3 |
| 2012/0207476 A1* | 8/2012 | Agrell .................. H04B 10/532 398/65 |
| 2012/0271461 A1 | 10/2012 | Spata |
| 2013/0116880 A1 | 5/2013 | Shitamoto et al. |
| 2013/0162822 A1 | 6/2013 | Lee et al. |
| 2013/0274986 A1* | 10/2013 | Trepagnier .......... G05D 1/0214 701/26 |
| 2014/0316616 A1 | 10/2014 | Kugelmass |
| 2015/0234387 A1 | 8/2015 | Mullan et al. |
| 2015/0336269 A1* | 11/2015 | Linnell ................. B25J 9/1656 700/245 |
| 2015/0336668 A1* | 11/2015 | Pasko ................... B64C 39/024 701/2 |
| 2016/0070265 A1* | 3/2016 | Liu ...................... G05D 1/0088 701/3 |
| 2016/0116915 A1 | 4/2016 | Pulleti et al. |
| 2016/0140851 A1* | 5/2016 | Levy ..................... G08G 5/045 701/3 |
| 2016/0210863 A1* | 7/2016 | Kohn-Rich .......... G08G 5/0086 |
| 2016/0327959 A1 | 11/2016 | Brown et al. |
| 2017/0088130 A1* | 3/2017 | Suzuki .................. G08G 1/168 |
| 2017/0097645 A1* | 4/2017 | Garland ................ B64D 47/08 |
| 2017/0301249 A1* | 10/2017 | Kunzi ................. G05D 1/0088 |
| 2017/0301250 A1* | 10/2017 | Ell ........................... G06T 7/50 |
| 2018/0074174 A1 | 3/2018 | Beer et al. |
| 2018/0143312 A1 | 5/2018 | High et al. |
| 2020/0354083 A1 | 11/2020 | Priest |
| 2021/0088337 A1 | 3/2021 | Koubaa |
| 2021/0272466 A1 | 9/2021 | Ahn |
| 2021/0365036 A1 | 11/2021 | Dix et al. |
| 2022/0051577 A1 | 2/2022 | Ali et al. |

FOREIGN PATENT DOCUMENTS

| | | |
|---|---|---|
| EP | 2595024 A1 | 5/2013 |
| JP | 2006515233 A | 5/2006 |
| JP | 2009288930 A | 12/2009 |
| JP | 2014119901 A | 6/2014 |
| JP | 2014219723 A | 11/2014 |
| JP | 2021189508 A | 12/2021 |
| KR | 20150086065 A * | 7/2015 |
| KR | 1020150136209 | 12/2015 |
| WO | 2018009189 A1 | 1/2018 |
| WO | 2018190833 A1 | 10/2018 |
| WO | 2018190834 A1 | 10/2018 |

OTHER PUBLICATIONS

Examination Report dated Jan. 27, 2021 in European Patent Application No. 16831542.2, 5 pages.
Ong, S.M. "A Mission Planning Expert System with Three-Dimensional Path Optimization for the NPS Model 2 Autonomous Underwater Vehicle", Calhoun: The NPS Institutional Archive Theses and Dissertations Thesis and Dissertation Collection, Jun. 1, 1990.
Second Notice of Preliminary Rejection dated Feb. 26, 2021 in Korean Patent Application No. 10-2019-7003709 with English translation, 15 pages.
Yudong Zhang et al.: "UCAV Path Planning by Fitness-Scaling Adaptive Chaotic Particle Swarm Optimization", Mathematical Problems in Engineering, vol. 2013, No. 9, Jun. 28, 2013 (Jun. 28, 2013), pp. 1-9.
International Search Report and Written Opinion for PCT/US2016/041208, dated Mar. 20, 2017, 11 pages.
Kuhn, H., W., "The Hungarian Method for the Assignment Problem", Naval Research Logistics Quarterly, vol. 2, 1955, pp. 83-97.
Maurer, C., et al., "A Linear Time Algorithm for Computing Exact Euclidean Distance Transforms of Binary Images in Arbitrary Dimensions," IEEE Transactions on Pattern Analysis and Machine Intelligence, vol. 25, No. 2, Feb. 2003, pp. 265-270.
Ong, M. S., "A Mission Planning Expert System with Three Dimensional Path Optimization for the NPS Model 2 Autonomous Underwater Vehicle", Naval Postgraduate School, Theses and Dissertations, Jun. 1990, California, 194 pages.
Orlin, B., J., et al., "New Scaling Algorithms for the Assignment and Minimum Cycle Mean Problems", Mathematical Programming, vol. 54, 1992, pp. 41-56.
Paglieroni, D., et al., "Matching Random Tree Models of Spatio-Temporal Patterns to Tables or Graphs", Proceedings IEEE Conference on Computational Intelligence and Data Mining (CIDM), Honolulu, HI, Apr. 1-5, 2007, pp. 560-567.
Paglieroni, D., et al., "A Unified Distance Transform Algorithm and Architecture," Machine Vision and Applications, vol. 5, Issue 1, 1992, pp. 47-55.
Rosenfeld A., et al., "Sequential Operations in Digital Picture Processing," Journal of the Association for Computing Machinery, vol. 13, No. 4, 1966, pp. 471-494.
Zhang, Y., et al., "UCAV Path Planning by Fitness-Scaling Adaptive Chaotic Particle Swarm Optimization", Mathematical Problems in Engineering, vol. 2013, Article ID 705238, Jul. 2013, 9 pages.
Ahuja et al., "Faster Algorithms for the Shortest Path Problem", Journal Assoc. Comput. Mach., vol. 37, No. 2, Apr. 1990, pp. 213-223.
Bennet, D.J. and C.R. McInnes, "Autonomous Three-Dimensional Formation Flight for a Swarm of Unmanned Aerial Vehicles," J. Guidance, Control, and Dynamics, vol. 34, No. 6, Nov.-Dec. 2011, pp. 1899-1908.
Cavazzuti, M., "Optimization Methods: From Theory to Design," Springer-Verlag Berlin Heidelberg, 2013, chap. 2, pp. 13-56.
Chambers, H., D., "Estimation of time-of-arrivals and contacts," 12 pages.
Chambers, H., D., "Gradient Descent Navigation Method for Collision Avoidance," 9 pages.

(56) References Cited

OTHER PUBLICATIONS

Chi, Tieng et al. "A Strategy of Multi-robot Formation and Obstacle Avoidance in Unknown Environment," Proceedings of the IEEE, China, Aug. 2016.
Clark, R. et al., "Autonomous Swarm Testbed with Multiple Quadcopters," Proceedings of the 1st World Congress of Unmanned Systems Engineering, 2014.
Cruz, Y.I., "An Algorithm for Autonomous Formation Obstacle Avoidance," Thesis for Master of Science in Aeronautics and Astronautics, University of Washington, 2013.
Dijkstra "A Note on Two Problems in Connexion with Graphs", Numerische Mathematik, vol. 1, 1959, pp. 269-271.
Fink, M. and C. Prada, "Acoustic Time-Reversal Mirrors," Institute of Physics Publishing, Inverse Problems, 17:R1-R38, 2001.
Freedman, et al., "Fibonacci Heaps and their Uses in Improved Network Optimization Algorithms", Journal Assoc. Comput. Mach., vol. 34, No. 3, Jul. 1987, pp. 596-615.
Gageik, et al., "Obstacle Detection and Collision Avoidance for a UAV With Complementary Low-Cost Sensors," IEEE Access, vol. 3, Jun. 2015.
Goerzen, et al., "A Survey of Motion Planning Algorithms from the Perspective of Autonomous UAV Guidance," © Springer Science + Business Media B.V. 2009.
Hart, et al., "A Formal Basis for the Heuristic Determination of Minimum Cost Paths," IEEE, vol. ssc-4, No. 2, Jul. 1968.
Hrabar, "Reactive Obstacle Avoidance for Rotorcraft UAVs,"2011 IEEE/RSJ International Conference on Intelligent Robots and Systems Sep. 25-30, 2011. San Francisco, CA, USA.
International Search Report and Written Opinion of Paglieroni et al., issued in International Application No. PCT/US17/27260, dated Dec. 22, 2017, 20 pages.
International Search Report and Written Opinion, received in Application No. PCT/US17/27253, dated Feb. 2, 2018, 27 pages.
Kendoul, et al., "Survey of Advances in Guidance, Navigation, and Control of Unmanned Rotorcraft Systems," Journal of Field Robotics 29(2), 315-378 (2012).
Khatib, "The potential filed approach and operational space formulation in robot control," Proc. Fourth Yale Workshop on Applications of Adaptive Systems Theory Yale University, May 1985.
Kushleyev, A. et al., "Towards a Swarm of Agile Micro Quadrotors," GRASP Lab, University of Pennsylvania, 2013.
Lum, C. et al., "Formation Flight of Swarms of Autonomous Vehicles in Obstructed Environments Using Vector Field Navigation," University of Washington, 2012.
Luque-Vega, et al., "Distributed Control for Multiple Quadrotors with Obstacle Avoidance Using Potential Fields,"WAC 2016 1570244885.
Martin, et al., "Robot Evidence Grids,"The Robotics Institute Carnegie Mellon University Pittsburgh, Mar. 1996.
Masoud, "Kinodynamic Motion Planning," IEEE Robotics & Automation Magazine, Mar. 2010.
Ouellet D. et al., "Control of Swarms of Autonomous Robots Using Model Driven Development—A State-Based Approach," IEEE 2011, 8 pages.
Paul et al. "UAV Formation Flight using 3D potential Filed," Department of Engineering Cybernetics, Norway, 2008.
Rizqi et al. "Path Planning and Formation Control via Potential Function for UAV Quadrotor," ARIS 2014, Taipei, Taiwan.
Scherer, et al., "Flying Fast and Low Among Obstacles: Methodology and Experiments," The International Journal of Robotics Research vol. 27, No. 5, May 2008, pp. 549-574.
Sfeir, J., et al., "An Improved Artificial Potential Field Approach to Real-Time Mobile Robot Path Planning in an Unknown Environment", 978-1-4577-0820, IEEE, Jul. 2011.
Vasarhelvyi, G. et al., "Outdoor Flocking and Formation Flight with Autonomous Aerial Robots," MT-ELTE Research Group for Statistical and Biological Physics, Budapest, Hungary, 2014.
Xu, Shengdong et al. "Real Time 3D Navigation for Autonomous Vision-Guided MAVs," IEE/RSJ 978-1-4799-9994-1/15, 2015, Hamburg, Germany.
Xue, Z. and J. Zeng, "Formation Control Numerical Simulations of Geometric Patterns for Unmanned Autonomous Vehicles with Swarm Dynamical Methodologies," 2009 International Conference on Measuring Technology and Mechatronics Atuomation, 6 pages.
Yan et al. "Path Planning in Complex 3D Environment Using a Probabilistic Roadmap Method," International Journal of Automation and Computing, 10(6), Dec. 2013, 525-533.
Zelek, "Dynamic Path Planning," Centre for Intelligent Machines & Dept. of Electrical Engineering McGill University, Montreal, Quebec, Canada, 1995, H3A2A7.

\* cited by examiner

OBJECT SENSE AND AVOID SYSTEM FOR AUTONOMOUS VEHICLES

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Unmanned aerial vehicles ("UAVs"), also referred to as unmanned aircraft systems ("UAS") or drones, are employed for a wide variety of applications such as military, scientific, commercial, humanitarian, and recreational applications. UAVs can be controlled in various ways that range from autonomous control by a navigation system to remote control by an operator. The navigation (or guidance) systems that provide autonomous control may be on board the UAVs or at ground stations that receive data from the UAVs and transmit instructions to the UAVs. A navigation system may simply navigate the UAV to a destination location along a specified route (e.g., a straight line) defined by Global Positioning System ("GPS") coordinates. More sophisticated navigation systems may interface with an onboard imaging system that collects images of the environment near the UAV. The navigation system may process the images to identify obstacles in the way of the UAV (e.g., buildings, mountains, and trees) and direct the UAV on a route to avoid the obstacles. When a UAV is under remote control of an operator, the UAV may have an onboard camera system that streams images of the environment to the operator. If the UAV does not have an onboard camera system, the operator needs to have a line of sight to the UAV. The operator may use various cockpit-type controls to guide the UAV.

Navigation systems that process images to identify obstacles can be very expensive and can add significant weight to a UAV. These navigation systems include camera systems, image processing systems, obstacle detection systems, route planning systems, and so on. A significant portion of the expense is driven by the computational and storage resources that are needed to process the images. Each image may require tens of megabytes for storage. To process the images in real time, the navigation systems may require high-end processing systems and may require custom-designed processors. The expense and weight of such navigation systems make them impractical for use by UAVs except for high-end military applications. As a result, UAVs for commercial and recreational use are remotely controlled based on having a line of sight to the UAVs.

DETAILED DESCRIPTION

Figure 1:
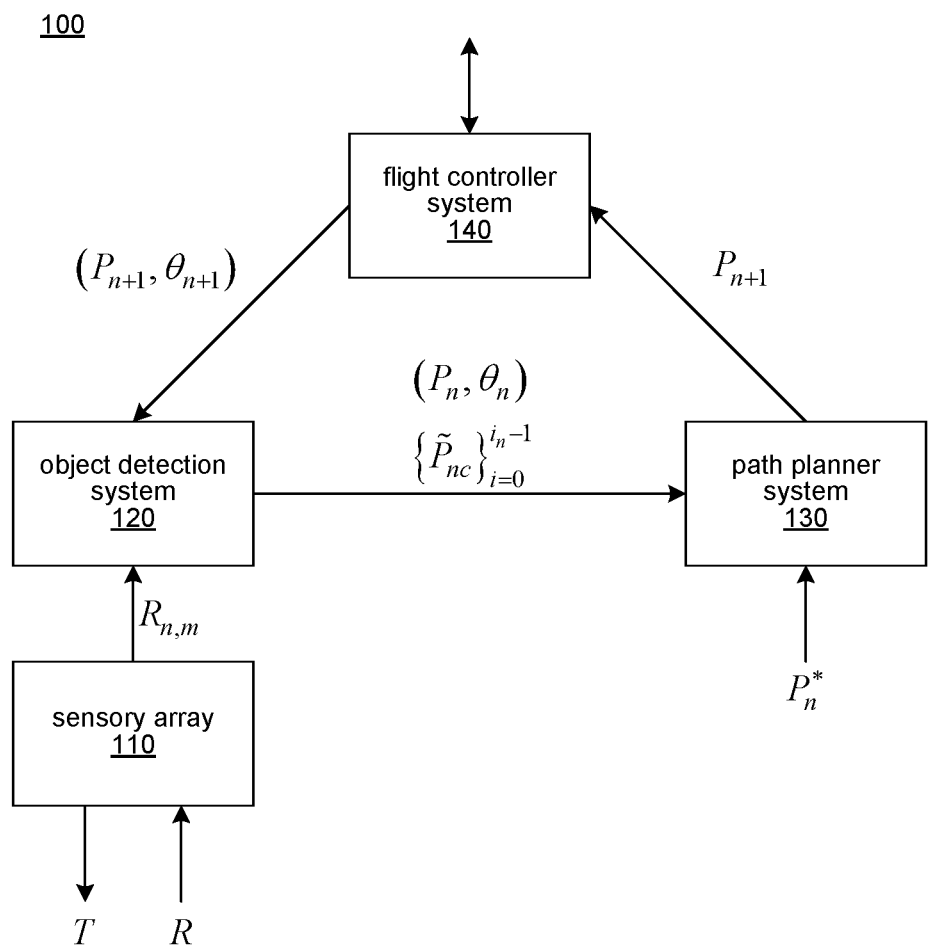
FIG. 1 is a block diagram illustrating components of the OSA system in some embodiments.

A method and system for determining a travel path for a UAV to travel to a target while avoiding objects (i.e., obstacles) without the use of an imaging system is provided. In some embodiments, an object sense and avoid ("OSA") system detects objects in an object field that is adjacent to the UAV and dynamically generates, as the UAV travels, a travel path to the target to avoid the objects. The OSA system includes a sensor array, an object detection system, and a path planner system. The OSA system repeatedly uses the sensor array to collect sensor data of any objects in the object field. For example, the sensor array may transmit radar signals and receive the return signals that are reflected by the objects. The object detection system then detects the objects and determines their locations based on the sensor data. For example, the object detection system may triangulate an object's location based on return signals received by multiple sensors. The path planner system then plans a next travel direction for the UAV to avoid the detected objects while seeking to minimize the distance traveled. For example, the path planner system selects a next travel direction that is as close to the direction to the target ("target direction") as possible that maintains a desired clearance from the detected objects. The OSA system then instructs the UAV to travel in the travel direction until the process is repeated and a new travel direction is planned that takes into consideration the objects that are currently in the object field. The OSA system uses the location and orientation of the UAV, which may be acquired from an onboard system of the UAV, when determining the locations of the objects.

In some embodiments, the sensor array is mounted on the UAV for transmitting signals and receiving return signals indicating the presence of objects. For example, the sensor array may include a transmitter of electromagnetic signals (e.g., radar and LIDAR) and various receivers for receiving return signals indicating that the transmitted signals are reflected from objects. The object detection system identifies return signals that may correspond to objects and identifies which of those return signals correspond to the same object. To identify return signals that may correspond to objects, the object detection system may base the identification in part on the strength of the return signal. The object detection system may determine which return signals correspond to the same object based on the distances that the return signals traveled and then determine the location of the object based on triangulation of the distances. Since actual objects have an extent and return signals are received for the entire extent, the object detection system uses an object resolution to determine various locations of the object. For example, if the resolution is one meter and the actual object has an extent of 10 square meters, then the object detection system may represent the actual object internally as 10 objects, each of which has its own location given by the coordinate (x,y,z). Given the locations of objects in the object field, the path planner system identifies a travel direction for the UAV based on distances from a travel path in the direction of travel to the objects and deviation of the travel direction from a target direction from the UAV to the target. For example, if objects near the UAV are too close to a direct path from the UAV to the target (referred to as the target path), then the path planner system will select a travel direction that is as close as possible to the target direction of the target path and that allows the UAV to maintain sufficient distance between it and any objects. The OSA system provides that travel direction as the next direction for the UAV.

In some embodiments, the path planner system identifies a travel direction for traveling from a current location of the UAV to the target based on a transit volume. A transit volume is a volume adjacent to the UAV sufficiently large enough to encompass objects that are near enough to the UAV to affect selection of the travel direction. For example, the transit volume may be a rectangular cuboid that extends 20 meters in front of the UAV (i.e., positive y-direction of a UAV coordinate system) and 20 meters in each direction to the left, right, below, and above the UAV (i.e., negative and positive X-direction and negative and positive z-direction of the UAV coordinate system). The size of such a transit volume is 32,000 cubic meters. The path planner system divides the transit volume into sub-volumes based on a desired object resolution. For example, if the desired object resolution is one meter, then the rectangular cuboid would be divided into 32,000 one-meter cubes. The object resolution can vary based on various factors such as resolution of the sensor array, the needed clearance from objects, and the computational resources of the OSA system. The path planner system identifies the sub-volumes of the transit volume that contain objects. For example, the path planner system may use an object data structure that is a three-dimensional array with an element for each sub-volume. Thus, the object data structure for a transit volume of 32,000 sub-volumes would have 32,000 elements indexed by (i,j,k) where i ranges from −20 to 20, j ranges from 0 to 20, and k ranges from −20 to 20, with the UAV considered to be at the sub-volume corresponding to the (0,0,0) element. For each location of an object, the path planner system sets a flag in the object data structure corresponding to the sub-volume that contains the object.

After the sub-volumes that contain objects are identified, the path planner system calculates a transit score for each sub-volume. The transit score for a sub-volume indicates the suitability for the travel path to be in the sub-volume direction (i.e., direction from the UAV to the sub-volume) based on how close the sub-volume is to the object and the deviation of the sub-volume direction from the target direction. For example, a sub-volume that is not near an object and that has a sub-volume direction that is close to the target direction has a high transit score. As another example, a sub-volume that contains an object irrespective of whether the sub-value direction is the same as the target direction would have a low transit score. The path planner may use a transit score data structure, which, like the object data structure, has an element for each sub-volume, to store the transit score for each sub-volume. In some embodiments, the path planner system may use a distance data structure with an element for each sub-volume to store the distance of each sub-volume to the closest object. The distances may be Euclidean or Manhattan (i.e., city-block) distances. The path planner system may use these distances to generate the transit score.

Although a sub-volume may have a high transit score, there may be objects too close to the sub-volume path of the sub-volume to make travel in the sub-volume direction feasible. So, after the transit scores are calculated, the path planner system selects for the travel direction the sub-volume direction of a sub-volume based on the transit score of the sub-volume and the sub-volume path satisfying a clearance criterion. The clearance criterion may specify the minimum required distance between an object and the sub-volume path for the sub-volume direction to be qualified to be the travel direction. The planning system may identify the sub-volume that has the highest transit score and whose sub-volume path satisfies the clearance criterion and select the sub-volume direction of the identified sub-volume as the travel direction. The path planner system may use the distances of the distance data structure to determine whether the clearance criterion for a sub-volume path is satisfied. The path planner system then provides the travel direction as the next direction for the UAV.

Although the OSA system is described primarily in the context of a UAV, the OSA system may be used to control a variety of autonomous vehicles ("AVs") that are autonomously driven. The AVs may include UAVs, unmanned ground vehicles ("UGVs"), unmanned underwater vehicles ("UUVs"), and unmanned space vehicles ("USVs"). These vehicles are "unmanned" in the sense that a person does not control the guidance of the vehicle irrespective of whether a person is actually on board the vehicle. For example, a UGV may transport several people with the UGV's guidance under the sole control of the OSA system. For UGVs, the transit volume may need to be only slightly higher than the vehicle and may be effectively considered to be a plane or volume with a height of one in the z-direction (vertical). If the UGV is, for example, operating in a parking structure, the transit volume may be represented by a stack of planes—one for each level of the parking structure. For UUVs, the sensor array may be sonar-based, but the OSA system would operate in similar manner to that for UAVs. For USVs, the OSA system may be particularly useful in helping a satellite avoid collisions with space debris or other satellites. The OSA system for USVs may employ a larger transit volume to encompass a wider approach of objects. In addition, the OSA system may be augmented with the estimated locations of known space objects determined from orbital parameters (e.g., Keplerian elements) of the space objects to help in determining whether return signals correspond to an object. In some embodiments, the OSA system may not even employ a sensor array but rather may rely solely on the estimated locations of the known space objects determined from the orbital parameter. Also, although the OSA system is described primarily based on a transit volume that is in front of the AV, the transit volume may surround the AV. In such a case, the AV may include multiple sensor arrays to sense the entire area around the vehicle. Such a surrounding transit volume may be useful, for example, to sense and avoid objects (e.g., space debris) that are traveling towards the AV from the rear.

The path planner system may select travel directions so that a UAV takes evasive maneuvers to avoid an imminent collision with an object. For example, a predator UAV may be attempting to intercept a prey UAV before it reaches its target by colliding with the prey UAV. In such a case, the OSA system of the prey UAV may calculate a new travel direction that is more than 90° away from the target direction because the predator UAV moved from to the left of the prey UAV to right in front of the prey UAV. If the prey UAV was traveling in the target direction, the sudden and significant change in the travel direction by the prey UAV is effectively an evasive maneuver to avoid colliding with the predator UAV. The new travel direction may result in the prey UAV rapidly ascending or descending or even reversing direction. If the prey UAV has a surrounding transit volume, then the OSA system can take evasive maneuvers even if the predator UAV approaches from the rear. In such a case, the OSA system may select a travel direction that is close to the target direction, but would override the selection because the predator UAV is too close. The OSA system may determine the predator UAV's travel direction based on successive location determinations and set the overriding travel direction to be, for example, perpendicular to the predator UAV's travel direction. If the transit volume was only in front of the prey UAV, the prey UAV may enter an evasive maneuver mode. While in the evasive maneuver mode, the prey UAV may continually orient itself in an attempt to keep the predator UAV within the transit volume while the predator UAV is within the range of the transit volume.

The OSA system may also be used to control movement in robotic systems such as fixed-base robotic systems and free-moving robotic systems. A fixed-base system, such as those used on production lines, typically includes a robot manipulator, an end effector (e.g., tool or gripper), and a safety interlock system. The fixed-base robotic system may be taught its motion using a teach pendant, which is typically a handheld unit used to program the trajectory of the robot. The safety interlock system may include force sensors to detect a collision or a light curtain sensor to disable the robot manipulator when a person is near the workspace of the fixed-base robotic system. The OSA system allows a fixed-base robotic system to detect intrusions and alter the trajectory of the robot manipulator. As a result, worker safety can be improved, and throughput of a capital-intensive production line can be maintained by avoiding costly shutdowns. In addition, use of the OSA system can eliminate the need to teach with a teach pendant and the need for force sensors or a light curtain sensor. The OSA system can be used to determine a travel path for picking up and placing parts for a production line. The OSA system can be used to direct the end effector to a target that is the location of a part within the cell of the fixed-base system for pick up while avoiding neighboring cells, for example, by controlling the roll, pitch, and yaw of the robot manipulator. The OSA system can then be used to direct the end effector to a target that is the desired location of a part on a production line. To direct the end effector to pick up or place a part, the sub-volumes of the transit volume can be refined (i.e., made smaller) in the vicinity of a convergence zone (i.e., near the pickup and placement locations). The output of the OSA system can be used to generate and issue commands to the robot manipulator to slow down, change orientation, or signal readiness to dock, interlock, mate, operate a tool, and so on. A sensor array may be located on the robot manipulator near the end effector or at a fixed location.

Free-moving robotic systems include servant robots and companion robots. The OSA system can be used to plan a travel path when a robot is moving parts or supplies within a hospital, production line, shipping facility, and so on in a manner similar to planning a travel path for a UGV. The payload of the free-moving robotic system may be a tool, part, supply, sensing system, interactive communicator (for a companion robot), and so on. The target is the desired destination of the robot. The desired destination may be a moving target, for example, such as the person that a companion robot is following. The OSA system allows the robot to move to the destination while avoiding stationary and moving objects. A sensor array may be located on the front of a free-moving robotic system. The OSA system may be used to navigate robotic systems safely, efficiently, and reliably through complex environments.

FIG. 1 is a block diagram illustrating components of the OSA system in some embodiments. The OSA system 100 includes a sensor array 110, an object detection system 120, a path planner system 130, and a flight controller system 140. The sensor array transmits transmit signals T and receives return signals R. The sensor array provides the return signals $R_{n,m}$ corresponding for time n for receiver m. The object detection system is also provided with the current location $P_{n+1}$ and the current orientation of the UAV indicated by the rotation matrix $\theta_{n+1}$ relative to a fixed coordinate system as collected by the flight controller. The object detection system provides to the path planner system the current location and orientation of the UAV and the point location of each detected object $\tilde{P}_{nc}$ for time n and object c. The path planner system is also provided with the current location of the target $P_n^*$. For example, the target may be 10 meters above a moving vehicle that the UAV is to track. In such a case, the target may be calculated based on the current location of the vehicle as reported by a location system (e.g., GPS system) on board the vehicle. The path planner system calculates the travel direction and then provides the travel direction to the flight controller system, for example, as a location $\overline{P}_{n+1}$. The flight controller system directs the UAV to travel in the travel direction. The object detection system, the path planner system, and the flight controller system repeat their processing at intervals to determine the next travel direction given the objects currently in the transit volume adjacent to the UAV.

In some embodiments, the object detection system and path controller system are implemented in software that is executed by an onboard processor. The processor may send instructions via a Micro Air Vehicle Communication Protocol ("MAVLink") to an autopilot system of the UAV. The processor and the autopilot system may be connected via a Universal Asynchronous Receiver/Transmitter ("UART") connection. Suitable processors may include, for example, Odroid C1+, Odroid XU4, Raspberry Pi, Intel Edison, Intel NUC, Gigabyte Brix, and NVIDIA Jetson TK1. In some embodiments, aspects of the OSA system may be executed by a processor that is not on board. In such an embodiment, an onboard processor may include a WiFi interface to receive data from and transmit data to a ground station processor. If the path controller system is executed by the ground station processor, then the onboard processor transmits the object locations identified by the objection detection system to the ground station processor and receives the travel directions and possibly the target location from the ground station processor. The onboard processor and the ground station processor may communicate via an Intel WiFi Link 5000 adapter.

In some embodiments, the OSA system employs a time domain or frequency domain radar for the sensor array. For a 4" resolution, a frequency of 85 GHz (or greater) achieves the 4" resolution at a range of 20' using a 10" diameter of the aperture. The resolution can be represented by the following equation:

$$Res = \frac{1.2*c*R}{(f*d)}$$

where c represents the speed of light, R represents the range, f represents the frequency, and d represents the diameter of the aperture.

Figure 2A:
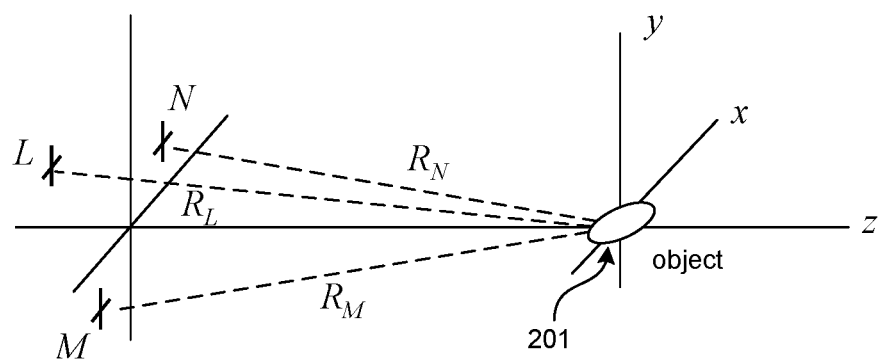
FIG. 2A illustrates the ranges derived from three sensors.

The object can be localized using a sensor array of three coplanar sensors and the ranges derived from the return signals. FIG. 2A illustrates the ranges derived from three sensors. The sensors L, M, and N are coplanar in the plane of y=0 of the UAV coordinate system in which the UAV is at coordinate (0,0,0). The OSA system determines the ranges $R_L$, $R_N$, and $R_M$ for sensors L, M, and N from the return signals from object 201. The range can be determined as represented by the following equation:

$$R=(t*c)/2$$

where t represent the time between the transmission of the signal and reception of the return signal.

Figure 2B:
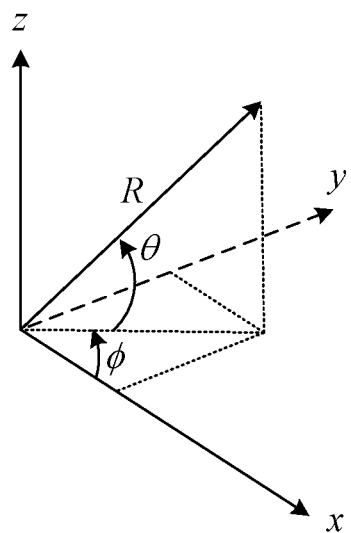
FIG. 2B illustrates the localization of an object.

The OSA system may localize objects in front of the sensor array as a combination of range R, elevation θ, and bearing φ. FIG. 2B illustrates the localization of an object. Using triangulation, the OSA system identifies that object 201 is at a specified range, elevation, and bearing relative to the UAV. The coordinates of the object in the UAV coordinate system are represented by the following equation:

$$(x,y,z)=(R*\cos θ*\cos φ, R*\cos θ*\sin φ, R*\sin θ)$$

In some embodiments, the OSA system may use three or more receivers that are not collinear and that need not be coplanar to determine the range, elevation, and bearing. The sensor array may be constructed using inexpensive semiconductor components and printed antennas on lightweight printed circuit board or other suitable substrate. The back of this array may be shielded with foil to reduce noise or interference to and from other UAV payloads, sensors, or electronics.

Figure 3A:
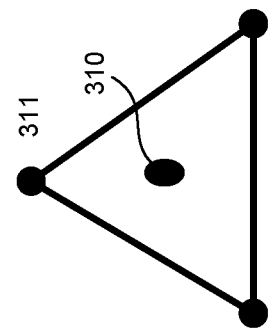
FIG. 3A illustrates various geometries for a sensor array with one transmitter.
Figure 3A:
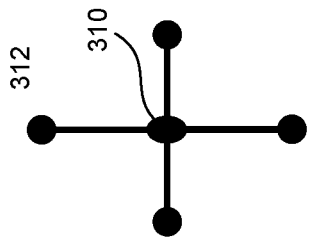
Figure 3A:
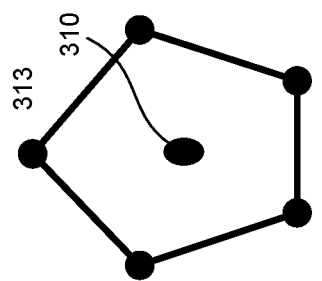
Figure 3A:
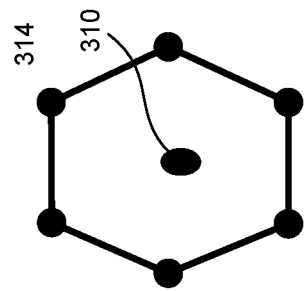
Figure 3A:
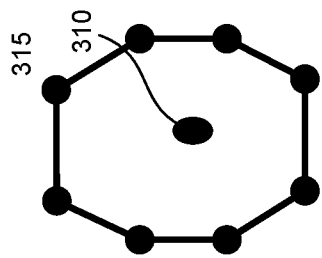
Figure 3B:
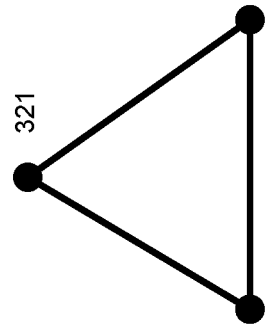
FIG. 3B illustrates various geometries for a sensor array of transceivers.
Figure 3B:
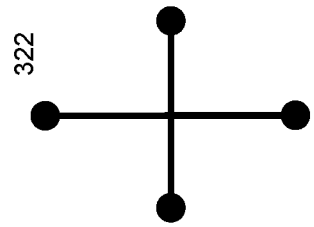
Figure 3B:
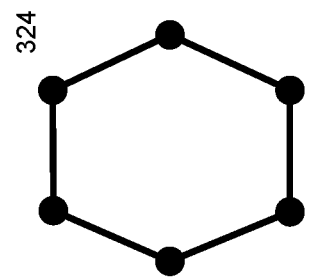
Figure 3B:
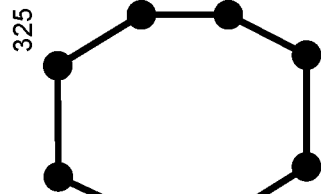

The OSA system may employ various geometries for the sensor array that include a transmitter and a coplanar array of receivers. FIG. 3A illustrates various geometries for a sensor array with one transmitter. The sensor arrays 311-315 each include one transmitter 310 and 3, 4, 5, 6, and 8 receivers, respectively, at the vertices. Although three receivers are needed for triangulation, additional sensors may help increase object detection and signal-to-noise ratio. The transmitter 310 transmits a signal and all receivers listens for the return signal. The OSA system may alternatively employ various geometries for the sensor array that includes three or more transceivers. FIG. 3B illustrates various geometries for a sensor array of transceivers. The sensor arrays 321-325 include 3, 4, 5, 6, and 8 transceivers, respectively, at the vertices. The transceivers transmit in sequence and each may listens for its unique return signal resulting in N return signals, where N is a the number of transceivers. Alternatively, the transceivers transmit in sequence and each transceiver listens for each return signal resulting in $N^2$ return signals. To improve the detection of long, thin targets (e.g., power lines), the OSA system may employ a sensor array that is sensitive to polarization in two orthogonal directions. If polarization was in only one direction, then very little return signal would be generated when the polarization is parallel to a long, thin target. The OSA system may use a sensor array that employs crossed dipole antennas or circularly polarized antennas.

Figure 4:
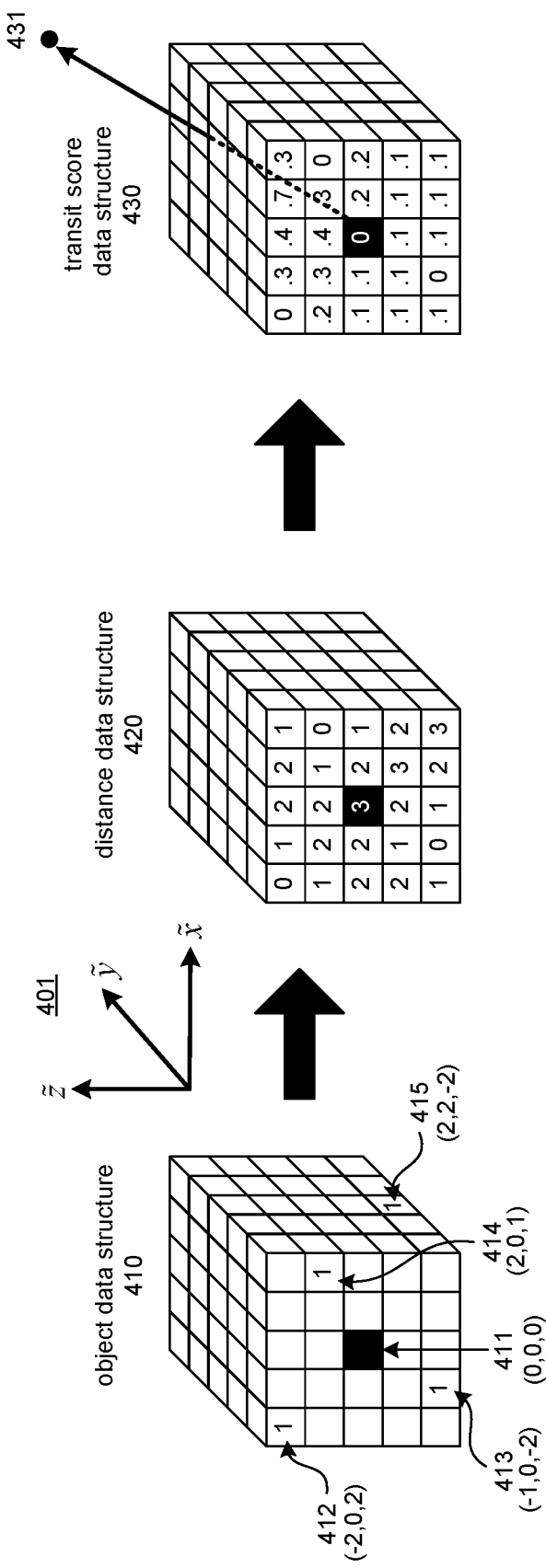
FIG. 4 is a block diagram that illustrates various data structures used by the OSA system in some embodiments.

FIG. 4 is a block diagram that illustrates various data structures used by the OSA system in some embodiments. The data structures are an object data structure 410, a distance data structure 420, and a transit score data structure 430. These data structures represent data stored for each of the sub-volumes of the transit volume that is a cube. Axes 401 illustrates the orientation of the UAV coordinate system. Each element of a data structure corresponds to a sub-cube. The elements and sub-cubes are identified by a three-dimensional index in which the element (1, 2, 1) corresponds to sub-cube (1, 2, 1). Element (0, 0, 0) 411 represents the sub-cube that contains the UAV. The object data structure contains a 1 for each sub-cube that contains an object. The elements (−2, 0, 2), (−1, 0, −2), (2, 0, 1), and (2, 2, −2) 412-415 contain a 1 indicating that the corresponding sub-cubes contain an object. The OSA system populates the object data structure based on the object locations as determined from the return signals. The distance data structure contains the distance of each sub-cube to the closest object. In this example, a Manhattan distance metric is used. The distances from sub-cube (0, 0, 0) to objects in sub-cubes (−2, 0, 2), (−1, 0, −2), (2, 0, 1), and (2, 2, −2) are 4, 3, 3, and 6, respectively. Thus, element (0, 0, 0) contains a 3. The distances from sub-cube (2, 0, 2) to objects in sub-cubes (−2, 0, 2), (−1, 0, −2), (2, 0, 1), and (2, 2, 2) are 4, 7, 1, and 5, respectively. Thus, element (2, 0, 2) contains a 1. The transit score data structure contains the transit score for each sub-cube indicating suitability of the sub-cube for being in the travel direction based on distance of the sub-cube to an object (as indicated by the distance data structure) and deviation from the target direction to the target 431. Since sub-cubes (−2, 0, 2), (−1, 0, −2), (2, 0, 1), and (2, 2, 2) contain an object, they have a transit score of 0.0—indicating that the UAV should not travel through that sub-cube. Sub-cube (1, 0, 2) has a transit score of 0.7 indicating that its sub-cube direction is similar to that of the target direction and that it is not too close to an object (as indicated by the distance data structure).

The OSA system supports autonomous path planning for UAVs in a way that meets various objectives. One objective is that the sensor array needs to be lightweight and compact so that it can be mounted on a UAV. Another objective is that the algorithms implemented on an onboard processor need to be efficient enough to process the sensor data in real time. The algorithms need to account for stationary objects that may come in and out of sensor view as the travel direction changes, moving objects (e.g., other UAVs), and a target that may be moving. The OSA system performs path planning for collision avoidance based on sequences of transit volumes derived from active sensor data acquired in real time by the UAV. The active sensor data is radar, sonar, LIDAR, acoustic, and so on The transit volume simultaneously accounts for the location of the UAV, the location of the target (whether stationary or moving), and the location of the objects (whether stationary or moving).

For active sensor data acquired at a sequence of times $t_n=t_0+n\Delta_t$ for n=0, 1 . . . , the OSA system uses a fixed or absolute coordinate system xyz (east-north-vertical) and a UAV coordinate system x̃ỹz̃ relative to the location of the UAV at time $t_n$. The (x̃ỹz̃) coordinates are related to the (x,y,z) coordinates through a 3D offset and a 3×3 rotation matrix derived from three rotation angles (such as UAV roll, pitch, and yaw). The sensor array and a GPS device are mounted on the UAV.

The path planner system and the flight controller system may be hosted either on a processing board mounted to the UAV or remotely on a wirelessly connected computer workstation. At time $t_n$, the path planner system receives (i) the location $P_n=[x_n, y_n, z_n]'$ of the UAV in the fixed coordinate, which is the origin of the UAV coordinate system, (ii) the 3×3 rotation matrix $\Theta_n$ from the fixed space coordinate system to the UAV coordinate system, and (iii) the locations $\{\tilde{P}_{ni}=[\tilde{x}_{ni},\tilde{y}_{ni},\tilde{z}_{ni}]'\}i=0^{n-1}$ of the objects detected at time $t_n$ in the UAV coordinate system. The coordinate transformations between the fixed coordinates P and UAV coordinates $\tilde{P}$ at time $t_n$ are represented by the following equations:

$$\tilde{P}=\Theta_n[P-P_n], P=\Theta_n^{-1}\tilde{P}+P_n=\Theta_n'\tilde{P}+P_n$$

The location $P_n^*=[x_n^*, y_n^*, z_n^*]$ in the fixed coordinate system of the target at time $t_n$ is provided or otherwise relayed remotely to the OSA system. The target can either be stationary (in which case $P_n^*=P^* \forall n$) or moving. The path planner system computes the location $P_{n+1}$ in the fixed coordinate system that the UAV is to move to at time $t_n$ (i.e., travel direction) and provides the location as input to the flight controller system. The flight controller system computes the rotation matrix $\Theta_{n+1}$ from the fixed coordinate system to the UAV coordinate system at time $t_{n+1}$ based on the flight dynamic model for the UAV. The flight controller system then provides the specification $P_{+1}$, $\Theta_{n+1}$) of the UAV coordinate system relative to the fixed coordinate system as input to the object detection system for time $t_{n+1}$.

The UAV coordinate system at time $t_n$ is shown in FIG. 2B, where the $\tilde{x}$ axis is pointed in the instantaneous UAV cross-range direction, the $\tilde{y}$ axis is pointed in the range (forward) direction, and the $\tilde{z}$ axis completes the right-handed coordinate system. The transit volume for the sensor array may occupy a cube that spans $[-\tilde{x}_{max}, \tilde{x}_{max}]\times[0, \tilde{y}_{max}]\times[-\tilde{z}_{max}, \tilde{z}_{max}]$ in the UAV coordinate system at time $t_n$.

At each sensor data acquisition time $t_n$ or observation interval, the OSA system extracts coordinates for a set of locations of objects $\{\tilde{P}_{ni}\}_{i=0}^{i_n-1}$. The OSA system stores the indications of the locations in the object data structure that represents the transit volume. For the sub-volume $b_n=\{b_n(i,j,k)\}_{i=0}^{n_x-1}{}_{j=0}^{n_y-1}{}_{k=0}^{n_z-1}$ at time $t_n$, a value of one occurs only at the locations of objects acquired at time $t_n$ or at locations of objects stored in $b_{n-1}$ that fall within the transit volume at time $t_n$.

Each sub-volume occupies a cubic volume of width $\Delta$ in the fixed coordinate system. The indexes (i,j,k) of the object data structure are computed from coordinates $(\tilde{x},\tilde{y},\tilde{z})$ in the UAV coordinate system as represented by the following equations:

$$i = \text{int}\left[\frac{\tilde{x}+\tilde{x}_{max}}{2\tilde{x}_{max}}(n_x-1)+0.5\right], (n_x-1)\Delta = 2\tilde{x}_{max}$$

$$j = \text{int}\left[\frac{\tilde{y}}{\tilde{y}_{max}}(n_y-1)+0.5\right], (n_y-1)\Delta = \tilde{y}_{max}$$

$$k = \text{int}\left[\frac{\tilde{z}+\tilde{z}_{max}}{2\tilde{z}_{max}}(n_z-1)+0.5\right], (n_z-1)\Delta = 2\tilde{z}_{max}$$

where $b_n(i,j,k)=1$ only if element (i,j,k) corresponds to the sub-volume that includes the object at location $(\tilde{x},\tilde{y},\tilde{z})$ in the UAV centric coordinate system at time $t_n$ or in $b_{n-1}$.

The OSA system uses a distance data structure $d_n=\{d_n(i,j,k)\}_{i=0}^{n_x-1}{}_{j=0}^{n_y-1}{}_{k=0}^{n_z-1}$ where $d_n(i,j,k)$ is the Euclidean (or other, such as city-block) distance (in meters) from the sub-volume represented by element (i,j,k) in $b_n$ to the nearest element in $b_n$ with a value of 1. The OSA system can compute $d_n$ using the Euclidean (or other, such as city-block) distance transform algorithms as described in Azriel Rosenfeld and John Pfaltz, "Sequential Operations in Digital Picture Processing," Journal of the Association for Computing Machinery, Vol. 13, No. 4, 1966, pp. 471-494, David W. Paglieroni, "A Unified Distance Transform Algorithm and Architecture," Machine Vision and Applications, Vol. 5, Issue 1, 1992, pp. 47-55, and Calvin Maurer, Rensheng Qi, and Vijay Raghavan, "A Linear Time Algorithm for Computing Exact Euclidean Distance Transforms of Binary Images in Arbitrary Dimensions," IEEE Transactions on Pattern Analysis and Machine Intelligence, Vol. 25, No. 2, February 2003, pp. 265-270, which are hereby incorporated by reference.

The OSA system employs a transit score data structure $J_n=\{J_n(i,j,k)\}_{i=0}^{n_x-1}{}_{j=0}^{n_y-1}{}_{k=0}^{n_z-1}$, where $J_n(i,j,k)$ is the transit score (e.g., from 0 to 1) associated with the sub-volume corresponding to element (i,j,k). Conceptually, transit score $J_n(i,j,k)$ increases when (i) the distance between (i,j,k) and all objects increases, and (ii) the sub-volume direction from the UAV to the sub-element represented by element (i,j,k) and the target direction become more aligned.

Mathematically, $J_n(i,j,k)$ may increase as a unit ramp function $f(d_n(i,j,k))$ increases. The clearance distance or critical distance $d_{crit}$ represents the distance in meters beyond which an object is said to be "remote." While $d_{crit}$ can be designated manually, the OSA system can also calculate $d_{crit}$ dynamically based on the distribution of distance in the distance data structure. This distribution is an indicator of object density within the object field. For example, the OSA system could set $d_{crit}$ to the larger of some minimum distance $d_{min}$ and $\mu_d+n\sigma_d$, where $\mu_d$ and $\sigma_d$ are measures of distance average and spread derived from the distribution, and n is manually specified.

As discussed above, $J_n(i,j,k)$ should also increase as the angle $\theta_n(i,j,k)$ approaches zero, where $\theta_n(i,j,k)$ is the angle between the vectors emanating from a UAV going through (i) the sub-volume represented by element (i,j,k) and (ii) the target. In some embodiments, the OSA system calculates the transit score as represented by the following equation:

$$J_n(i,j,k) = \frac{1+\cos\theta_n(i,j,k)}{2} f(d_n(i,j,k)) \in [0,1]$$

where $$\cos\theta_n(i,j,k) = \frac{[\tilde{x},\tilde{y},\tilde{z}]\cdot[\tilde{x}_n^*,\tilde{y}_n^*,\tilde{z}_n^*]}{\|[\tilde{x},\tilde{y},\tilde{z}]\|\cdot\|[\tilde{x}_n^*,\tilde{y}_n^*,\tilde{z}_n^*]\|}$$

$$(\tilde{x},\tilde{y},\tilde{z}) = \left[\frac{2i\tilde{x}_{max}}{n_x-1}-\tilde{x}_{max}, \frac{j\tilde{y}_{max}}{n_y-1}, \frac{2k\tilde{z}_{max}}{n_z-1}-\tilde{z}_{max}\right]$$

$$[\tilde{x}_n^*,\tilde{y}_n^*,\tilde{z}_n^*] = \tilde{P}_n^* = \Theta_n[P_n^*-P_n]$$

The OSA system issues a path traversal command to the UAV every $\Delta_t$ seconds based on selection of the sub-volume with the highest transit score for which objects are not too close to the sub-volume path. To select the sub-volume, the OSA system sorts the sub-volumes in descending order of $J_n$ value and truncates the list to $M \leq n_x n_y n_z$ elements. For the first sub-volume in the truncated list, the OSA system determines the minimum of distance values for all sub-volumes along the sub-volume path to the sub-volume or alternatively the path that includes the sub-volume path and extends through the transit volume. If the minimum distance is greater than $d_{crit}$, the OSA system generates a command to traverse $\Delta$ meters along the sub-volume direction and completes. Otherwise, the OSA system processes the next sub-volume in the list and so on. If the list is processed in its entirety without finding a sub-volume whose minimum distance is greater than $d_{crit}$, the OSA system reduces the critical distance by a factor (e.g., sets $d_{crit}$ to $d_{crit}/2$), and reprocesses the list and so on until an incremental path traversal command has been successfully generated for the UAV. If the updated $d_{crit}$ value is less than $2\Delta$, an incremental path traversal command cannot be issued, causing the path planner system to return an error code.

Figure 5:
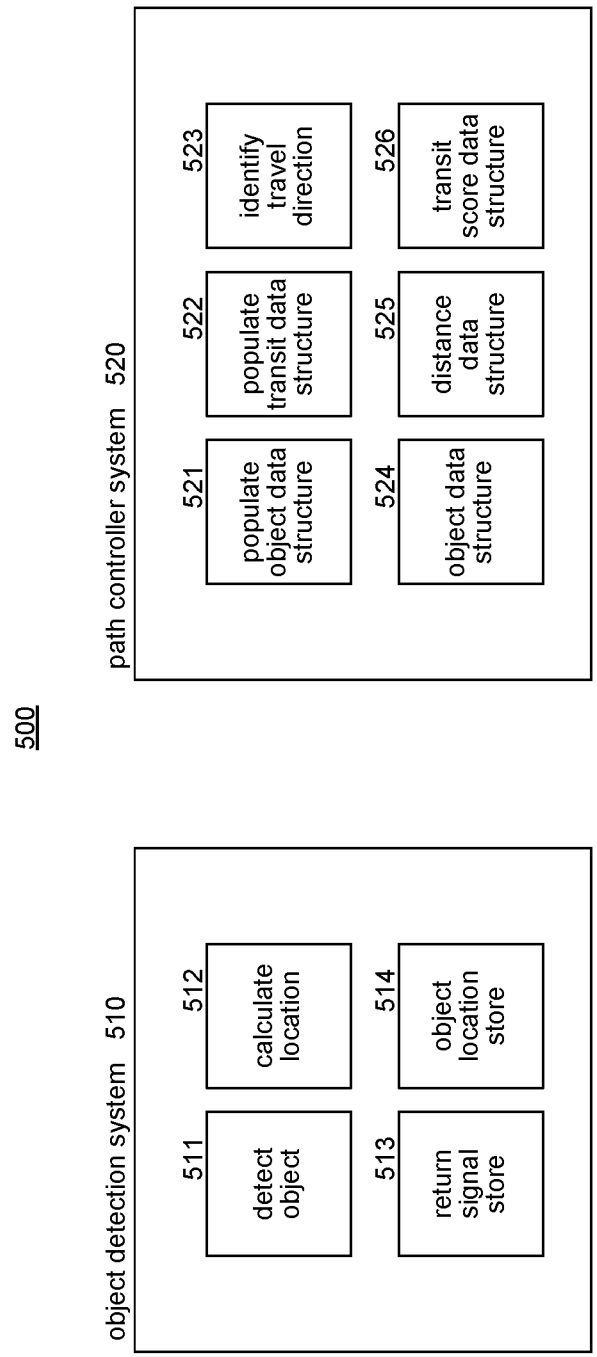
FIG. 5 is a block diagram illustrating components of the OSA system in some embodiments.

FIG. 5 is a block diagram illustrating components of the OSA system in some embodiments. The OSA system 500 includes an object detection system 510 and a path controller system 520. The object detection system includes a detect object component 511, a calculate location component 512, a return signal store 513, and an object location store 514. The detect object component processes the return signals of the return signal store to identify the presence of objects such as by identifying the ranges to each object as determined by different receivers. The calculate location component determines the locations of the object based on the ranges and stores the locations (e.g., as range, elevation, and bearing) in the object location store. The path controller system includes a populate object data structure component 521, a populate transit data structure component 522, and an identify travel direction 523. The path controller system may also include a populate distance data structure component (not shown). The path controller system also includes an object data structure 524, a distance data structure 525, and a transit score data structure 526. The populate object data structure component populates the object data structure to indicate sub-volumes that contain objects. The populate transit score data structure component populates the transit score data structure to indicate the transit scores of the sub-volumes.

The computing systems on which the OSA system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the OSA system. The data transmission media are used for transmitting data via transitory, propagating signals or carrier waves (e.g., electromagnetism) via a wired or wireless connection.

The OSA system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the OSA system may be implemented in hardware using, for example, an application-specific integrated circuit (ASIC).

Figure 6:
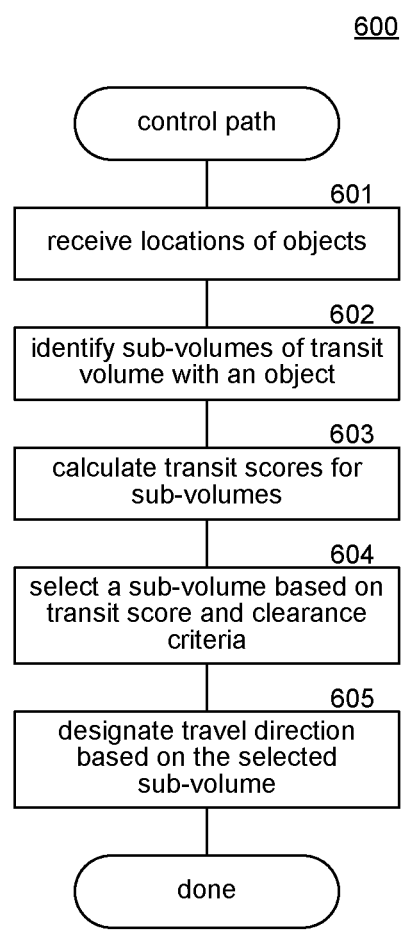
FIG. 6 is a flow diagram that illustrates overall processing of the path controller system of the OSA system in some embodiments.

FIG. 6 is a flow diagram that illustrates overall processing of the path controller system of the OSA system in some embodiments. The path controller system 600 is invoked at each observation interval to generate travel control instructions based on the locations of the objects detected during that interval. In block 601, the system receives the locations of the objects. In block 602, the system identifies sub-volumes of the transit volume that contain an object. The component sets the elements of the object data structure corresponding to the identified sub-volumes to indicate that the sub-volume contains an object. Although not illustrated in the flow diagram, the system may also populate the distance data structure to indicate the distance of each sub-volume to the nearest object. In block 603, the system calculates a transit score for each sub-volume. The system stores the transit scores in the transit score data structure. In block 604, the system selects a sub-volume for establishing the travel direction. The system may select the sub-volume with the highest transit score that satisfies a clearance criterion. The clearance criterion may be that no object is within a clearance distance of the sub-volume path. The clearance criterion may also be more sophisticated, such as that no object is within the clearance distance and no more than a certain number of objects are within a secondary clearance distance, for example, to avoid selecting a sub-volume path that is clear but has many objects just outside the clearance threshold. In block 605, the component designates the travel direction as the sub-volume direction of the selected sub-volume and then completes.

Figure 7:
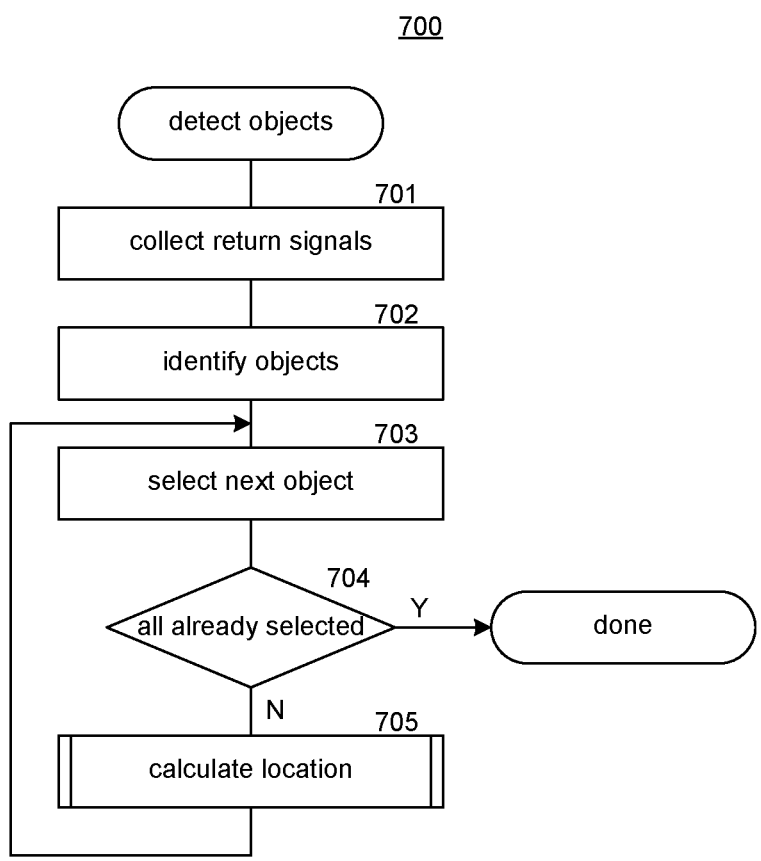
FIG. 7 is a flow diagram that illustrates processing of a detect objects component of the OSA system in some embodiments.

FIG. 7 is a flow diagram that illustrates processing of a detect objects component of the OSA system in some embodiments. The detect objects component 700 is invoked at each observation interval to detect objects and determine the locations of the objects. In block 701, the component collects the return signals from the sensor array. In block 702, the component identifies the return signals from the various receivers that correspond to the same object. In block 703, the component selects the next object that has been identified. In decision block 704, if all the identified objects have already been selected, then the component completes, else the component continues at block 705. In block 705, the component invokes a calculate location component to calculate the location of the selected object and then loops to block 703 to select the next object.

Figure 8:
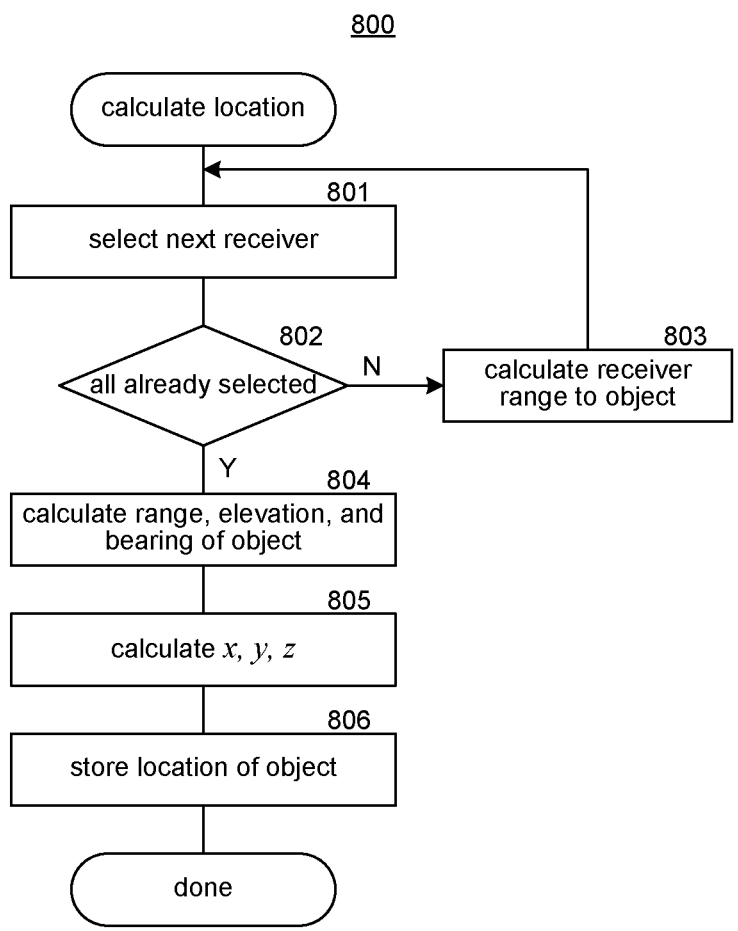
FIG. 8 is a flow diagram that illustrates processing of a calculate location component of the OSA system in some embodiments.

FIG. 8 is a flow diagram that illustrates processing of a calculate location component of the OSA system in some embodiments. The calculate location component 800 calculates the location of an object based on the times that the return signals for the object were received. In block 801, the component selects the next receiver of the sensor array. In decision block 802, if all the receivers have already been selected, then the component continues at block 804, else the component continues at block 803. In block 803, the component calculates a receiver range to the object based on the time the selected receiver received the return signal and loops to block 801 to select the next receiver. In block 804, the component calculates the range to the object and the elevation and bearing of the object by triangulating based on the receiver ranges. In block 805, the component calculates the coordinates of the object in the UAV coordinate system. In block 806, the component stores the coordinates of the object as the location of the object and then completes.

Figure 9:
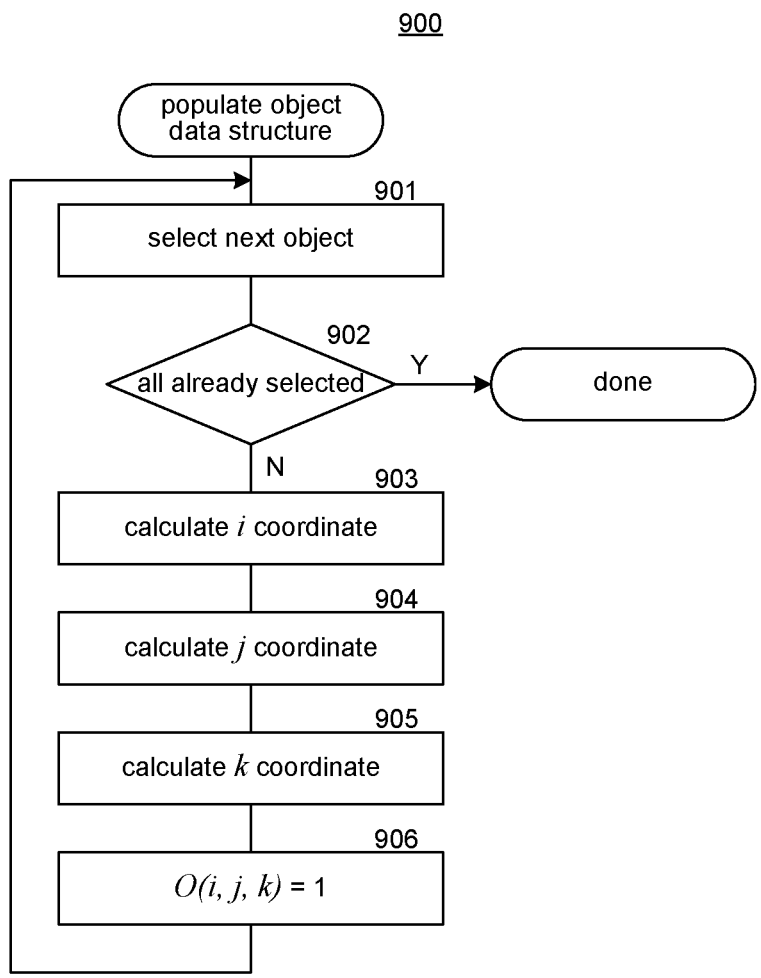
FIG. 9 is a flow diagram that illustrates processing of a populate object data structure component in some embodiments.

FIG. 9 is a flow diagram that illustrates processing of a populate object data structure component in some embodiments. The populate object data structure component 900 is passed the object locations and sets to 1 the elements of the object data structure that correspond to a sub-volume that contains an object. In block 901, the component selects the next object. In decision block 902, if all the objects have already been selected, then the component returns, else the component continues at block 903. In blocks 903-905, the component calculates the index (i, j, and k) that corresponds to the sub-volume that contains the selected object. In block 906, the component sets to 1 the element of the object data structure indexed by the index and then loops to block 901 to select the next object.

Figure 10:
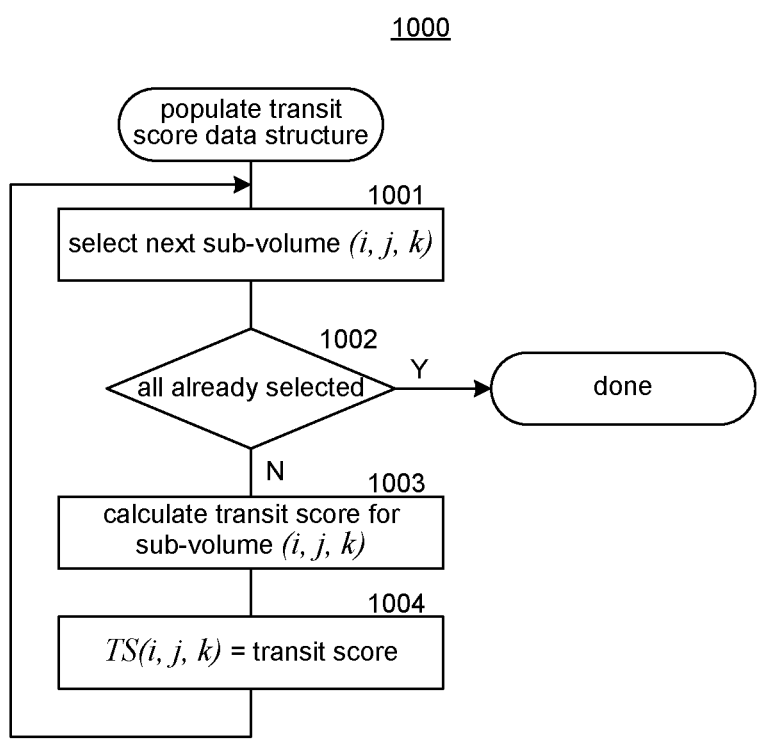
FIG. 10 is a flow diagram that illustrates processing of a populate transit score data structure component in some embodiments.

FIG. 10 is a flow diagram that illustrates processing of a populate transit score data structure component in some embodiments. The populate transit score data structure component 1000 loops calculating the transit score for each sub-volume. The component translates the location of the target given in the fixed coordinate system to the UAV coordinate system. In block 1001, the component selects the next sub-volume. In decision block 1002, if all the sub-volumes have already been selected, then the component completes, else the component continues at block 1003. In block 1003, the component calculates the transit score for the selected sub-volume. In block 1004, the component stores the transit score in the element of the transit score data structure corresponding to the selected sub-volume and then loops to block 1001 to select the next sub-volume.

Figure 11:
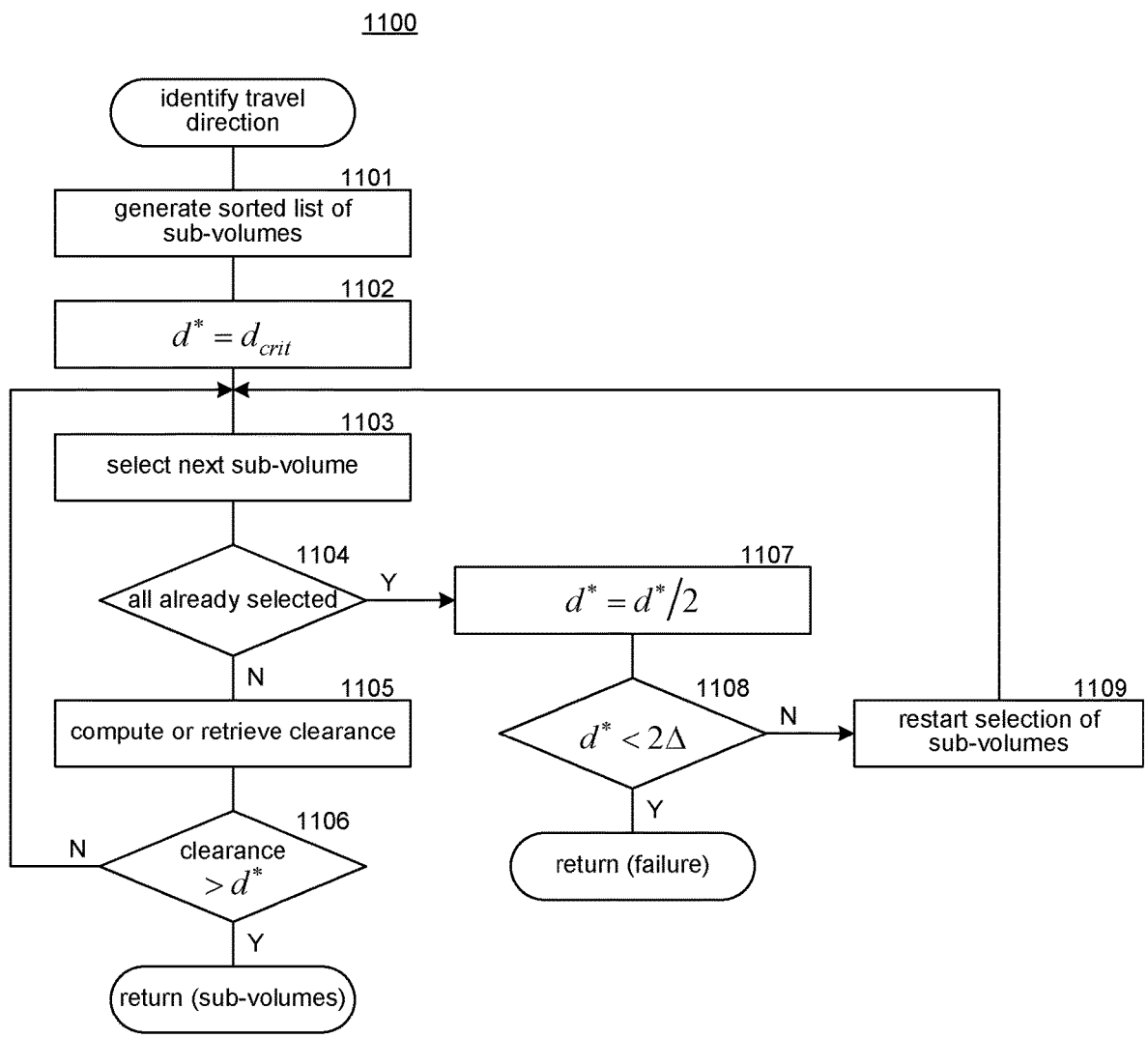
FIG. 11 is a flow diagram that illustrates processing of an identify travel direction component in some embodiments.

FIG. 11 is a flow diagram that illustrates processing of an identify travel direction component in some embodiments. The identify travel direction component 1100 identifies the sub-volume with the highest transit score that satisfies the clearance distance and sets the travel direction to be the sub-volume direction of the identified sub-volume. In block 1101, the component generates a list of the sub-volumes sorted based on transit score from high to low. In block 1102, the component initializes the clearance threshold. In blocks 1103-1106, the component loops determining whether a sub-volume satisfies the clearance distance. If no sub-volume satisfies the clearance distance, the component relaxes the clearance threshold and repeats the processing. In block 1103, the component selects the next sub-volume in the sorted list. In decision block 1104, if all the sub-volumes have already been selected, then no sub-volume satisfies the current clearance distance and the component continues at block 1107 to relax the clearance distance. In block 1105, the component computes (or retrieves if already computed) the clearance for the sub-volume path to the selected sub-volume. In decision block 1106, if the clearance satisfies the clearance threshold, the component returns the sub-volume as the basis for the travel direction, else the component loops to block 1103 to select the next sub-volume. In block 1107, the component relaxes the clearance distance, for example, by dividing the prior clearance distance by two. In decision block 1108, if the clearance distance is less than twice the sub-volume size, then the component returns an indication of a failure, else the component continues at block 1109. In block 1109, the component restarts the selection of the sub-volumes to the first sub-volume in the sorted list and continues at block 1103 to determine whether any sub-volumes satisfy the new clearance distance.

The following paragraphs describe various embodiments of aspects of the OSA system. An implementation of the OSA system may employ any combination of the embodiments. The processing described below may be performed by a computing device with a processor that executes computer-executable instructions stored on a computer-readable storage medium that implements the OSA system.

In some embodiments, a method performed by a computing system for identifying a travel direction that avoids objects for traveling from a current location to a target is provided. The method receives locations of objects and identifies sub-volumes of a transit volume adjacent to the current location that contain an object as indicated by the received locations. For each sub-volume, the method calculates a transit score based on distance to objects along a sub-volume path from the current location through the sub-volume and deviation of a sub-volume direction from a target direction. The sub-volume direction is a direction of a sub-volume path from the current location to the sub-volume, and the target direction is the direction from the current location to the target. The method selects a sub-volume based on the transit score of the sub-volume and based on the sub-volume path satisfying a clearance criterion. The method also designates the travel direction to be along the sub-volume path of the selected sub-volume. In some embodiments, the current location is a location of an unmanned aerial vehicle ("UAV") traveling to the target and the transit volume is a rectangular cuboid in front of the direction of travel of the UAV. In some embodiments, the sub-volumes are cubes. In some embodiments, the method instructs the UAV to proceed in the travel direction. In some embodiments, the UAV is at the origin of a UAV coordinate system that is aligned with the orientation of the UAV, the direction of travel of the UAV is along a y-axis, and the rectangular cuboid extends a distance along the positive x-, y-, and z-axes and along the negative x- and z-axes. In some embodiments, the method receives an indication of the current location and the current orientation of the UAV within a fixed coordinate system. In some embodiments, the distance to objects is calculated based on a Euclidean or Manhattan metric. In some embodiments, the transit score for a sub-volume increases as the distance to a closest object increases and as the angle between the sub-volume direction for the sub-volume and the target direction decreases. In some embodiments, the selecting of the sub-volume comprises selecting the sub-volume with the highest transit score, and the clearance criterion is satisfied when the minimum distance to an object along the sub-volume path is greater than a clearance distance. In some embodiments, when no sub-volume satisfies the clearance distance, the clearance distance is reduced. In some embodiments, the current location is a location of an unmanned underwater vehicle ("UUV") traveling to the target and the transit volume is in front of the direction of travel of the UUV. In some embodiments, the current location is a location of an unmanned ground vehicle ("UGV") traveling to the target and the transit volume is in front of the direction of travel of the UGV. In some embodiments, the current location is a location of an end effector of a robot manipulator being manipulated to move the end effector to the desired location for performing a task. In some embodiments, the task is placing a part during production of a product. In some embodiments, the task is picking up a part during production of a product. In some embodiments, the current location is a location of a free-moving robotic system traveling to the target and the transit volume is in front of the direction of travel of the free-moving robotic system. In some embodiments, the target is moving. In some embodiments, an object is moving.

In some embodiments, a control system for autonomously guiding an autonomous vehicle ("AV") to a target is provided. The control system includes a sensor array, an object detection system, a path planner system, and a flight controller system. The sensor array is mounted on the AV for transmitting signals from a transmitter and receiving at receivers return signals reflected from objects in a sensor field adjacent to the AV. The object detection system identifies return signals that correspond to the same object based on the distances the return signals traveled and determines the location of the object based on triangulation of the distances. The path planner system identifies a travel direction for the AV based on distances from a travel path in the travel direction to the objects and deviation of the travel direction from a target direction from the AV to the target. The controller system instructs the AV to proceed in the travel direction. In some embodiments, the signals of the sensor array are electromagnetic signals, and the sensor system is sensitive to polarization in two orthogonal directions. In some embodiments, the sensor array includes at least three receivers. In some embodiments, the sensor array includes multiple transceivers. In some embodiments, the AV includes a location system to determine the location of the AV within a fixed coordinate system and an orientation system to determine the orientation of the AV within the fixed coordinate system. In some embodiments, the travel direction is initially determined as a location in an AV coordinate system and converted to a location in the fixed coordinate system. In some embodiments, the path planner system identifies the sub-volumes of a transit volume adjacent to the AV that contain objects and sets the travel direction to a sub-volume direction of a sub-volume path from the AV to a sub-volume based on distances between the sub-volume path and objects and deviation of the sub-volume direction from the target direction. In some embodiments, the path planner system calculates a transit score for a sub-volume that increases as the distance from the sub-volume to a closest object increases and as the angle between the sub-volume direction and the target direction decreases. In some embodiments, the travel direction is set to the sub-volume direction of the sub-volume path of a sub-volume with the highest transit score and the sub-volume path satisfies a clearance criterion. In some embodiments, the clearance criterion is satisfied when the minimum distance to an object along the sub-volume path is greater than a clearance distance. In some embodiments, the AV is an unmanned aerial vehicle ("UAV"). In some embodiments, the AV is an unmanned underwater vehicle ("UUV"). In some embodiments, the AV is an unmanned ground vehicle ("UGV"). In some embodiments, the AV is a free-moving robotic system traveling to the target and the transit volume is in front of the direction of travel of the free-moving robotic system. In some embodiments, the target is moving. In some embodiments, an object is moving. In some embodiments, the path planner system identifies an overriding travel direction to override the travel direction to avoid a collision with the moving object.

In some embodiments, a control system for autonomously guiding an autonomous vehicle ("AV") to take evasive maneuvers to avoid collision with an object while traveling to a target is provided. The control system includes a sensor array mounted on the AV for transmitting signals from a transmitter and receiving at receivers return signals reflected from objects in a sensor field adjacent to the AV. The control system includes an object detection system that identifies return signals that correspond to the same object based on the distances the return signals traveled and determines the location of the object based on triangulation of the distances. The control system includes a path planner system that when collision with the object is not imminent, identifies a travel direction for the AV based on distances from a travel path in the travel direction to the objects and deviation of the travel direction from a target direction from the AV to the target and when collision with an object is imminent, identifies an overriding travel direction as an evasive maneuver. The control system includes a controller system that instructs the AV to proceed in the travel direction or the overriding travel direction. In some embodiments, the path planner system, when collision with the object is imminent, instructs the controller system to orient the AV so that the object sensor array can receive return signals reflected from the object. In some embodiments, the AV is an unmanned aerial vehicle ("UAV"). In some embodiments, the AV is an unmanned underwater vehicle ("UUV"). In some embodiments, the AV is an unmanned ground vehicle ("UGV"). In some embodiments, the AV is a free-moving robotic system traveling to the target and the transit volume is in front of the direction of travel of the free-moving robotic system.

In some embodiments, a control system for autonomously guiding a fixed-base robotic system is provided. The control system includes a sensor array transmitting signals from a transmitter and receiving at receivers return signals reflected from objects in a sensor field in a workspace of the fixed-base robotic system. The control system includes an object detection system that identifies return signals that correspond to the same object based on the distances the return signals traveled and determines the location of the object based on triangulation of the distances. The control system includes a path planner system that identifies a travel direction for an end effector of the fixed-base robotic system based on distances from a travel path in the travel direction to the objects and deviation of the travel direction from a target direction from end effector to the target. In some embodiments, the target is a location of a part to be picked up. In some embodiments, the target is a location of a part to be placed. In some embodiments, the control system includes a component that controls a robot manipulator of the fixed-based robotic system so that the end effector moves in the travel direction.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by a computing system for identifying a travel direction for traveling from a current location to a target, the method comprising:
controlling a sensor array mounted on a vehicle to transmit signals from a transmitter and to receive at receivers return signals reflected from objects in a sensor field adjacent to the vehicle;
identifying locations of the objects based on the return signals;
for each of a plurality of sub-volumes of a transit volume adjacent to the current location, calculating a transit score based on distance to an object along a sub-volume path from the current location through the sub-volume and deviation of a sub-volume direction from a target direction, the distance based on the current location and the location of the object, the sub-volume direction being a direction of the sub-volume path from the current location to the sub-volume and the target direction being the direction from the current location to the target, the deviation is represented as $On(i, j, k)$ which is the angle between vectors emanating from the vehicle going through (i)

the sub-volume represented by coordinates (i, j, k) and (ii) the target and the transit score being based on a cosine of On (i, j, k);

selecting a sub-volume based on the transit score of the sub-volume and based on the sub-volume path satisfying a clearance criterion; and designating the travel direction to be along the sub-volume path of the selected sub-volume.

2. The method of claim 1 wherein the current location is a location of an unmanned aerial vehicle ("UAV") traveling to the target and the transit volume is a rectangular cuboid in front of the direction of travel of the UAV.

3. The method of claim 2 wherein the sub-volumes are cubes.

4. The method of claim 2 wherein the UAV is at the origin of a UAV coordinate system that is aligned with the orientation of the UAV, the direction of travel of the UAV is along a y-axis, and the rectangular cuboid extends a distance along the positive x-, y-, and z-axes and along the negative x- and z-axes.

5. The method of claim 2 further comprising receiving an indication of the current location and the current orientation of the UAV within a fixed coordinate system.

6. The method of claim 1 wherein the distance to objects is calculated based on a Euclidean or Manhattan metric.

7. The method of claim 1 wherein the transit score for at least one sub-volume increases as the distance to a closest object increases and as the angle between the sub-volume direction for the sub-volume and the target direction decreases.

8. The method of claim 1 wherein the selecting of the sub-volume comprises selecting the sub-volume with the highest transit score and wherein the clearance criterion is satisfied when the minimum distance to an object along the sub-volume path is greater than a clearance distance.

9. The method of claim 8 wherein when no sub-volume satisfies the clearance distance, the clearance distance is reduced.

10. The method of claim 1 wherein the current location is a location of an unmanned underwater vehicle ("UUV") traveling to the target and the transit volume is in front of the direction of travel of the UUV.

11. The method of claim 1 wherein the current location is a location of an unmanned ground vehicle ("UGV") traveling to the target and the transit volume is in front of the direction of travel of the UGV.

12. The method of claim 1 wherein the current location is a location of an end effector of a robot manipulator being manipulated to move the end effector to the desired location for performing a task.

13. The method of claim 1 wherein the current location is a location of a free-moving robotic system traveling to the target and the transit volume is in front of the direction of travel of the free-moving robotic system.

14. The method of claim 13 wherein the task is picking up a part during production of a product.

15. The method of claim 13 wherein the task is placing a part during production of a product.

16. The method of claim 1 wherein the target is moving.

17. The method of claim 1 wherein at least one of the objects is moving.

18. A control system for autonomously guiding an autonomous vehicle ("AV") to a target, the control system comprising:

a sensor array mounted on the AV for transmitting signals from a transmitter and receiving at receivers return signals reflected from objects in a sensor field adjacent to the AV;

an object detection system that identifies the locations of the objects based on the return signals;

a path planner system that for each of a plurality of candidate travel directions, generates a transit score based on distances from a candidate travel path in the candidate travel direction to the objects and deviation of the candidate travel direction from a target direction from the AV to the target, the deviation is represented as On (i, j, k) which is the angle between vectors emanating from a UAV going through (i) the sub-volume represented by coordinates (i, j, k) and (ii) the target and the transit score being based on a cosine of On(i, j, k); and identifies a travel direction based on the transit scores of the candidate travel directions; and a controller system that instructs the AV to proceed in the travel direction.

19. The control system of claim 18 wherein the signals of the sensor array are electromagnetic signals and the sensor system is sensitive to polarization in two orthogonal directions.

20. The control system of claim 18 wherein the sensor array includes at least three receivers.

21. The control system of claim 18 wherein the sensor array includes multiple transceivers.

22. The control system of claim 18 wherein the AV includes a location system to determine the location of the AV within a fixed coordinate system and an orientation system to determine the orientation of the AV within the fixed coordinate system.

23. The control system of claim 18 wherein the path planner system identifies the sub-volumes of a transit volume that contain objects, the transit volume being adjacent to the AV, and sets the travel direction to a sub-volume direction of a sub-volume path from the AV to a particular sub-volume based on distances between the sub-volume path and objects and deviation of the sub-volume direction from the target direction.

24. The control system of claim 23 wherein the path planner system calculates a transit score for at least one of the sub-volumes that increases as the distance from the sub-volume to a closest object increases and as the angle between the sub-volume direction and the target direction decreases.

25. The control system of claim 24 wherein the travel direction is set to the sub-volume direction of a sub-volume path of a sub-volume with the highest transit score and the sub-volume path of the sub-volume satisfies a clearance criterion.

26. The control system of claim 25 wherein the clearance criterion is satisfied when the minimum distance to an object along the sub-volume path is greater than a clearance distance.

27. The control system of claim 18 wherein the AV is an unmanned aerial vehicle ("UAV").

28. The control system of claim 18 wherein the AV is an unmanned underwater vehicle ("UUV").

29. The control system of claim 18 wherein the AV is an unmanned ground vehicle ("UGV").

30. The control system of claim 18 wherein the AV is a free-moving robotic system traveling to the target and the transit volume is in front of the direction of travel of the free-moving robotic system.

31. The control system of claim 18 wherein the target is moving.

32. The control system of claim 19 wherein an object is moving.

33. The control system of claim 32 wherein the path planner system identifies an overriding travel direction to override the travel direction to avoid a collision with the moving object.

34. A control system for autonomously guiding a fixed-base robotic system, the control system comprising:
- a sensor array transmitting signals from a transmitter and receiving at receivers return signals reflected from objects in a sensor field in a workspace of the fixed-base robotic system;
- an object detection system that identifies the locations of the objects based on return signals that correspond to the same object; and
- a path planner system that identifies a travel direction for an end effector of the fixed-base robotic system to avoid the objects based on distances from a travel path in the travel direction to the objects and deviation of the travel direction from a target direction from end effector to the target the deviation is represented as @n (i, j, k) which is the angle between the vectors emanating from an unmanned aerial vehicle (UAV) going through (i) the sub-volume represented by coordinates (i, j, k) and (ii) the target and the transit score being based on a cosine of On(i,j,k).

35. The control system of claim 34 wherein the target is a location of a part to be picked up.

36. The control system of claim 34 wherein the target is a location of a part to be placed.

37. The control system of claim 34 further comprising a component that controls a robot manipulator of the fixed-based robotic system so that the end effector moves in the travel direction.

* * * * *